United States Patent
Sasagawa (10) Patent No.: US 8,767,237 B2
(45) Date of Patent: Jul. 1, 2014

(54) PRINTING AUTHENTICATION SYSTEM, PRINTING DEVICE, DEVICE MANAGEMENT APPARATUS AND NON-TRANSITORY COMPUTER READABLE RECORDING MEDIUM

(75) Inventor: Shigekazu Sasagawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 427 days.

(21) Appl. No.: 13/110,999

(22) Filed: May 19, 2011

(65) Prior Publication Data

US 2012/0099143 A1 Apr. 26, 2012

(30) Foreign Application Priority Data

Oct. 22, 2010 (JP) ................................ 2010-237311

(51) Int. Cl.
*G06K 1/00* (2006.01)
*G06F 15/00* (2006.01)
*G06F 3/12* (2006.01)

(52) U.S. Cl.
USPC .......... 358/1.15; 358/1.9; 358/1.14; 358/1.13

(58) Field of Classification Search
None
See application file for complete search history.

(56) References Cited

U.S. PATENT DOCUMENTS

| | | | |
|---|---|---|---|
| 2002/0097431 A1* | 7/2002 | Ikegami | 358/1.15 |
| 2002/0186410 A1* | 12/2002 | Tanaka | 358/1.15 |
| 2004/0187009 A1 | 9/2004 | Ebata | |
| 2005/0141020 A1* | 6/2005 | Harano | 358/1.15 |
| 2006/0044607 A1* | 3/2006 | Kato | 358/1.15 |
| 2007/0064269 A1* | 3/2007 | Mokuya et al. | 358/1.15 |
| 2007/0247660 A1* | 10/2007 | Nuggehalli | 358/1.15 |
| 2009/0174894 A1* | 7/2009 | Kamijo | 358/1.15 |
| 2009/0234867 A1* | 9/2009 | Miyazawa et al. | 707/100 |
| 2009/0300733 A1 | 12/2009 | Inomata et al. | |
| 2010/0080572 A1* | 4/2010 | Tsuzuki | 399/10 |

FOREIGN PATENT DOCUMENTS

| | | |
|---|---|---|
| JP | 2003-67174 A | 3/2003 |
| JP | 2004-303202 A | 10/2004 |
| JP | 2009-66929 A | 4/2009 |
| JP | 2009-289175 A | 12/2009 |
| JP | 2010-170451 A | 8/2010 |

OTHER PUBLICATIONS

Office Action dated Apr. 15, 2014 issued by the Japanese Patent Office in corresponding Japanese Application No. 2010-237311.

* cited by examiner

*Primary Examiner* — Ming Hon
(74) *Attorney, Agent, or Firm* — Sughrue Mion, PLLC (57) ABSTRACT

A printing authentication system includes an identification information storage unit, a providing unit and a specifying unit. The identification information storage unit stores, as an identification information set, plural pieces of user identification information given to a same user. If authentication is valid with regard to an authentication request accompanying specific user identification information, the providing unit reads out a specific user identification information set including the specific user identification information from the identification information storage unit and provides the specific user identification information set. If user identification information, associated with print data, of a requester who requests printing of the print data matches any one of the user identification information constituting the specific identification information set, the specifying unit specifies the print data as a printing target.

10 Claims, 10 Drawing Sheets

PRINTING AUTHENTICATION SYSTEM, PRINTING DEVICE, DEVICE MANAGEMENT APPARATUS AND NON-TRANSITORY COMPUTER READABLE RECORDING MEDIUM

CROSS-REFERENCE TO RELATED APPLICATIONS

This application is based on and claims priority under 35 USC 119 from Japanese Patent Application No. 2010-237311 filed Oct. 22, 2010.

BACKGROUND

1. Technical Field

The invention relates to a printing authentication system, a printing device, a device management apparatus and a non-transitory computer readable recording medium.

2. Related Art

These days, in a printing system that is put in practice in an office, a user management based on authentication has become common. For example, a security print that uses authentication has been known. In the security print, even if a user, who has operated a personal computer (PC) to log in a system, makes a request for printing to a printing device by using the PC, the printing is not immediately executed and a print job (which indicates the print request made by the user. In some cases, it indicates print data that is a target of the print request) is spooled (i.e., stored with being in a standby state). At this time, a requester ID (user identification information of the requester who made the request for print job), which is accompanied with the print job or is separately recognized, is also stored. The user identification information is identification information that is uniquely given to each user (hereinafter, referred to as a "user ID"). After the print request, when the user performs an input for authentication with an IC card and the like to the printing device, i.e., inputs the user ID (user identification information) and data for authentication to the printing device, an authentication process is executed. When the authentication is valid (successful), the printing device compares the authenticated user ID and the requester ID of the spooled print job and executes the printing of the print job which has been recognized as valid. At this time, the log information (process history) of the print process and information of the number of output sheets or output pages for billing and the like are also recorded in association with the print job. The above process is just exemplary, and there are various methods of the security print.

In environments in which the printing system is operated, plural systems for managing the users are operated in many cases. As core systems that give users user IDs (i.e., accounts) and manages them, there are various systems such as universal systems such as Active Directory (Microsoft Corporation) and Open Directory (Apple Computer, Inc.), and systems for individual intended purposes such as a drawing management system and a workflow management system. When a system is built, sometimes there is a case where the plural core systems co-exist in accordance with the past history or operating situations. In this case, typically, one user is individually given with user IDs from the core systems, respectively. The user logs in a core system to be used from now with the user ID that is conformable to the core system and then uses a variety of resources on the core system.

More specifically, when the user who has logged in the system makes a request for printing to the printing device and the printing device spools data of a job regarding the print request, the data is spooled in association with the user ID of the user in the core system. The data of the spooled job includes, in general, print data that describes an image of a document to be printed in the page description language (PDL). If one user logs in a core system and requests a printing device to print a document that has been edited in that environment and then logs in another core system and requests the printing device to print a document that has been edited in that environment, the printing device spools the two jobs regarding the print requests in association with the user IDs of the user of the respective core systems. In this case, the respective jobs are managed based on the two different user IDs. In order to print out the print data of the respective jobs, the user should input the unique user IDs for authentication to the printing device with respect to the respective jobs.

In this manner, if the plural systems having independent authentication devices co-exist, plural pieces of user identification information may be given to the same actual user (actually using subject). In this case, in the entire plural systems, the authentication is individually performed while assuming that the using subject exists for each of the user identification information, regardless of whether or not the actual users are the same. Further, in some cases, a same core system may provide a same user with plural pieces of user identification information. Alternatively, a same user may be given with plural pieces of user identification information due to other reasons.

SUMMARY

According to an aspect of the invention, a printing authentication system includes a printing device and a device management apparatus. The device management apparatus includes an identification information storage unit and a providing unit. The identification information storage unit stores, as an identification information set, plural pieces of user identification information given to a same user. If authentication is valid with regard to an authentication request accompanying specific user identification information from the printing device, the providing unit reads out a specific user identification information set including the specific user identification information from the identification information storage unit and provides the specific user identification information set to the printing device. The printing device includes a specifying unit and a printing execution unit. If user identification information, associated with print data, of a requester who requests printing of the print data matches any one of the user identification information constituting the specific identification information set, the specifying unit specifies the print data as a printing target. The printing execution unit executes the printing of the print data, which is specified as the printing target by the specifying unit.

BRIEF DESCRIPTION OF THE DRAWINGS

Exemplary embodiments will be described in detail below based on the accompanying drawings, wherein.

DETAILED DESCRIPTION

A system configuration according to an exemplary embodiment of the invention will be described with reference to FIG. 1. In this exemplary embodiment, a user PC (personal computer) 10, external authentication systems 14a, 14b, a printing device 20 and a device management system 30 are connected to a network 12 such as LAN (Local Area Network).

The external authentication systems 14a, 14b are systems that perform user authentication so as to manage users. A server that provides a user authentication function in a system such as Active Directory (Microsoft Corporation) or Open Directory (Apple Computer, Inc.) is exemplified. Also among systems for individual intended purposes such as a drawing management system and a workflow management system, there is a system that performs independent user authentication. Such user authentication function in the drawing management system or the like is also an example of the external authentication systems 14a, 14b. The respective external authentication systems 14a, 14b have user management databases 15a, 15b, respectively. Each of the user management databases 15a, 15b stores user identification information (user IDs) and registration data for authentication, which are managed by the respective user management databases 15a, 15b. The registration data for authentication is registration information for certifying users. The registration data for authentication, which are registered in the external authentication systems 14a, 14b, are of types complying with authentication methods adopted in the systems 14a, 14b, respectively. For instance, if the external authentication system 14a adopts a method that uses a password to perform the user authentication, registration passwords of the respective users are stored in the user management database 15a as the registration data for authentication. The registration data for authentication is not limited to the password and may be other information such as fingerprint data, other biological information, and a user's public key certificate. Also, the registration data for authentication may not be registered in the user management database 15a, 15b, depending on the authentication method.

The external authentication systems 14a, 14b are independent systems. In other words, when a same user (actual user who is a specific person) is registered in both the external authentication systems 14a, 14b, registered user IDs and registration data for authentication may be different in the systems 14a, 14b. Although a user may register the same user ID and registration data for authentication in the both systems 14a, 14b, the user registration is individually made in the both systems 14a, 14b. Thus, it is general that the user IDs and registration data for authentication are not identical between the systems 14a, 14b.

In this exemplary embodiment, the device management system 30 also has an independent user authentication function. Therefore, the systems 14a, 14b are called as 'external' authentication systems, which means that the systems 14a, 14b are 'external' authentication systems when viewed from the device management system 30. The device management system 30 also has a database (database 302 of FIG. 3 (which will be described later)) of the user IDs and registration data for authentication, which are registered independently of the external authentication systems 14a, 14b.

In this manner, it is assumed that the plural user authentication systems exist on the network 12 and that the same user is registered with different user IDs in the respective user authentication systems. Also, there may be a case where one same user is registered with plural user IDs in one user authentication system. For example, a user may have plural roles and separately use the user IDs for the respective roles.

Figure 1:
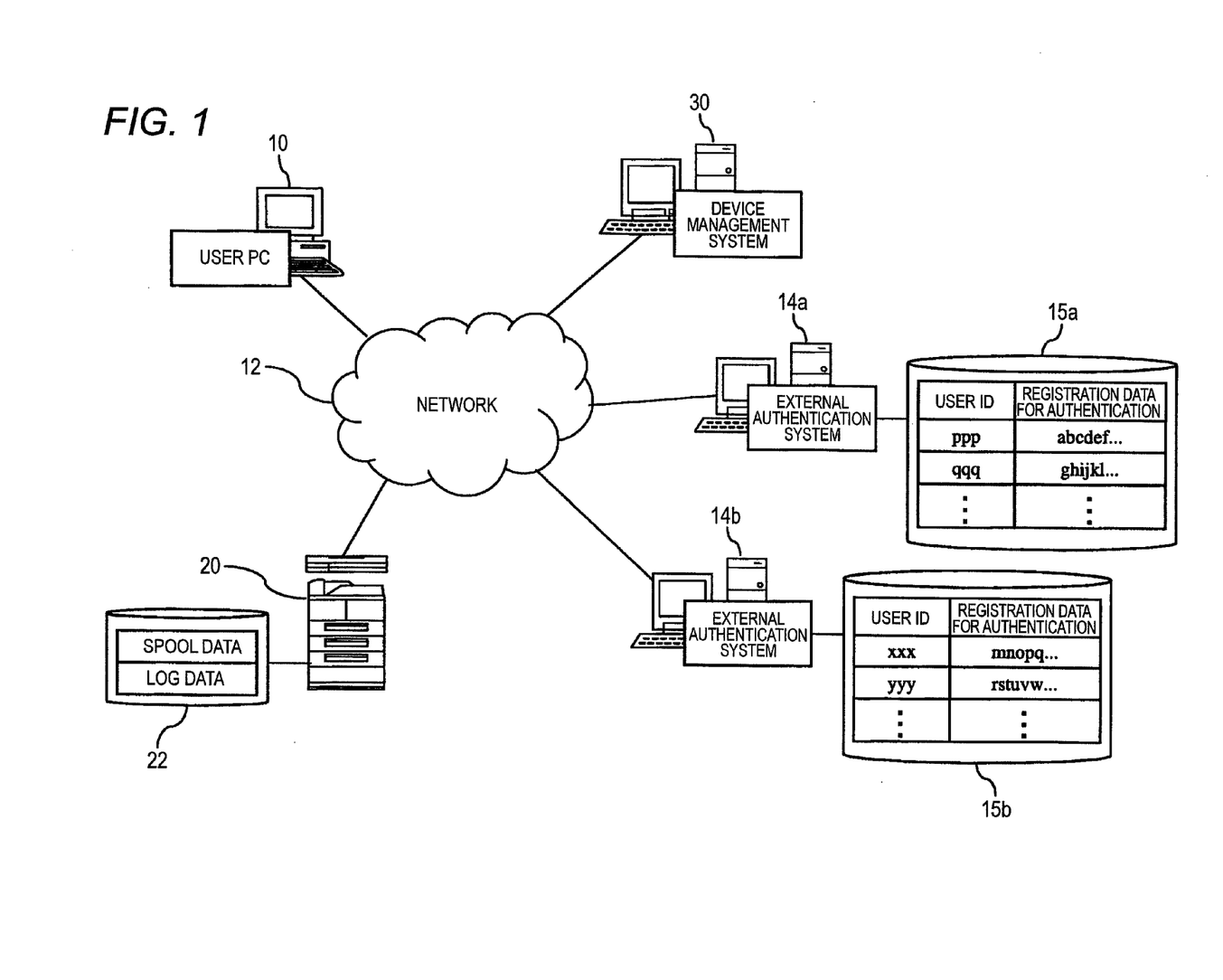
FIG. 1 shows an example of a system configuration according to an exemplary embodiment of the invention.

In the example of FIG. 1, the three user authentication systems of the two external authentication systems 14a, 14b and the authentication function of the device management system 30 are provided on the network 12. However, this is one of examples. The exemplary embodiment that will be described below can be generally applied to a case where one user is registered with plural user IDs in one or more user authentication systems. For example, even in the case where only one user management system exists on the network 12, the exemplary embodiment can be applied if a same user is given plural user IDs from the user management system.

The user PC 10 is a personal computer that a user uses. The user operates the user PC 10 to log in the user authentication system (the external authentication systems 14a, 14b or the device management system 30) in accordance with an application that the user wants to use, thereby performing the user authentication. For example, when the user wants to use an application such as browsing and editing of a drawing, the user logs in the user authentication system of the drawing management system.

FIG. 1 shows only one user PC 10. However, plural user PCs may exist on the network 12, and one user may have the plural user PCs 10, for example, including a PC for Widows (registered trademark) operating system and a PC for Mac operating system.

The printing device 20 is an apparatus that receives a print request from the user PC 10 via the network 12 and performs a print process in response to the print request. The printing device 20 may further have one or more of copier, network scanner and facsimile transmitting/receiving functions. Specifically, examples of the printing device 20 include a network printer, a digital copier, and a digital multifunctional device (which is a device having printer, scanner, copier, and facsimile functions).

The printing device 20 has such a function that when the printing device 20 receives a print request from the user PC 10 via the network 12, the printing device 20 does not immediately print print data, which is a target of the print request, but prints out the print data only after the user goes to the printing device 20 and succeeds in the user authentication. This is a function that is called as a security printing. The job data (which may also include the print data) indicating the print request, which is received from the user PC 10, is stored as spool data in a non-volatile storage device 22 such as hard disk drive or a flash SSD (solid state disk), which is provided in the printing device 20.

Also, the printing device 20 has a function of recording a history (log) of processes that the device 20 has executed, so as to manage the operation of the device 20 and/or billing. The log data is also stored in the non-volatile storage device 22.

The device management system 30 is a system that manages the printing device 20 and has functions of performing the user authentication in response to a request from the printing device 20 and collecting and processing the log data recorded in the printing device 20, for example. In FIG. 1, only one printing device 20 is shown. However, it is general that plural printing devices 20 exist on the network 20, and the device management system 30 manages the plural printing devices 20.

Figure 2:
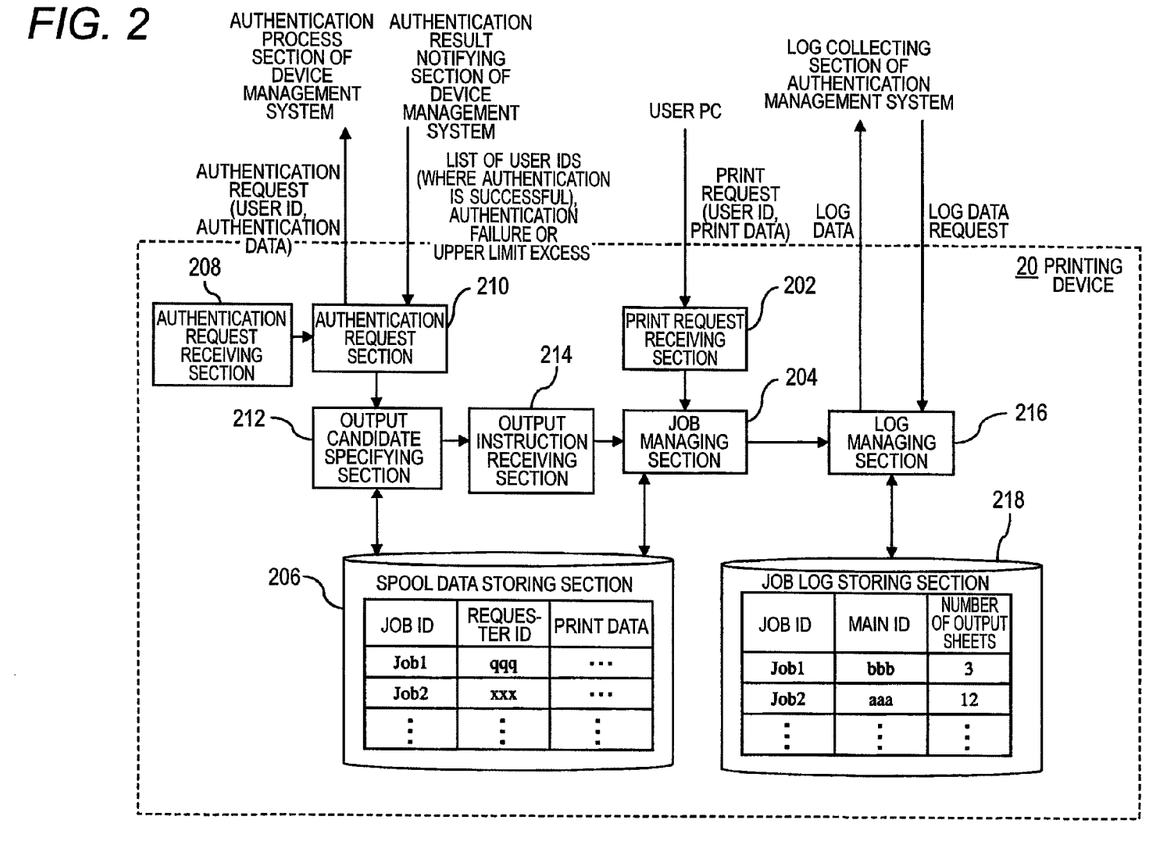
FIG. 2 shows an example of an internal configuration of a printing device according to the exemplary embodiment of the invention.

Next, an example of an internal configuration of the printing device 20 will be described with reference to FIG. 2.

A print request receiving section 202 provided in the printing device 20 is a functional module that receives a print request from the user PC 10. The print request from the user PC 10 includes a user ID of the user who has made the request and print data that indicates an image of a printing target and is described in the page description language. The user ID included in the print request is identification information of the user in the user authentication system (external authentication systems 14a, 14b) in which the user logs through the user PC 10 when the user makes the print request. A job managing section 204 is a functional module that manages jobs in the printing device 20. In this exemplary embodiment, the job means one print request that is made by a user. Seeing from another point of view, the job is a series of print processes that are executed by the printing device 20 in response to one print request. Also, for a case where the printing device 20 has a copying function, a copying process which is initiated by pressing a start button and is ended when all placed documents are completely copied is one job. Furthermore, regarding the scanner function and the facsimile transmitting function, a job can be also defined in a similar manner. The job managing section 204 manages an execution sequence of various jobs.

The job managing section 204 registers the print data, which is included in the print request received by the print request receiving section 202, in a spool data storing section 206 of the non-volatile storage device 22, in association with the user ID (which is also referred to as a "requester ID") included in the print request. At this time, the job managing section 204 gives the print request a unique job ID (identification information) and registers the user ID and job information (which includes the print data) included in the print request in the spool data storing section 206 in association with the job ID. One record including the job ID, the user ID ('requester ID' in FIG. 2) and the job information such as print data is one job record. The "requester ID" is used in FIG. 2 so as to indicate a user ID that the user uses for the print request.

In this exemplary embodiment, the printing device 20 provides (gives) the job ID. However, a job ID providing mechanism on the network 12 may provide the job ID. The device management system 30 may serve as the job ID providing mechanism.

The print data, which is stored in the spool data storing section 206, may be data, as it is, which is received from the user PC 10 and is described in the page description language or data that has been converted into a bitmap or intermediate format (intermediate format (for example, display list) between the page description language and the bitmap) so as to speed up the printing output after the user authentication.

An authentication request receiving section 208 receives a request for user authentication from the user. In other words, the authentication request receiving section 208 receives an input of the user ID and authentication data from the user. The authentication data is data for certifying a user who is indicated by the user ID, for example, password, biological information such as fingerprint, and signature information using a secret key stored in an IC card (when the authentication is performed using public key infrastructure). The authentication request receiving section 208 receives the input user ID and authentication data, which are input from a keypad and touch panel provided in an operation panel of the printing device 20 or from a device such as IC card reader or a fingerprint reader.

Figure 3:
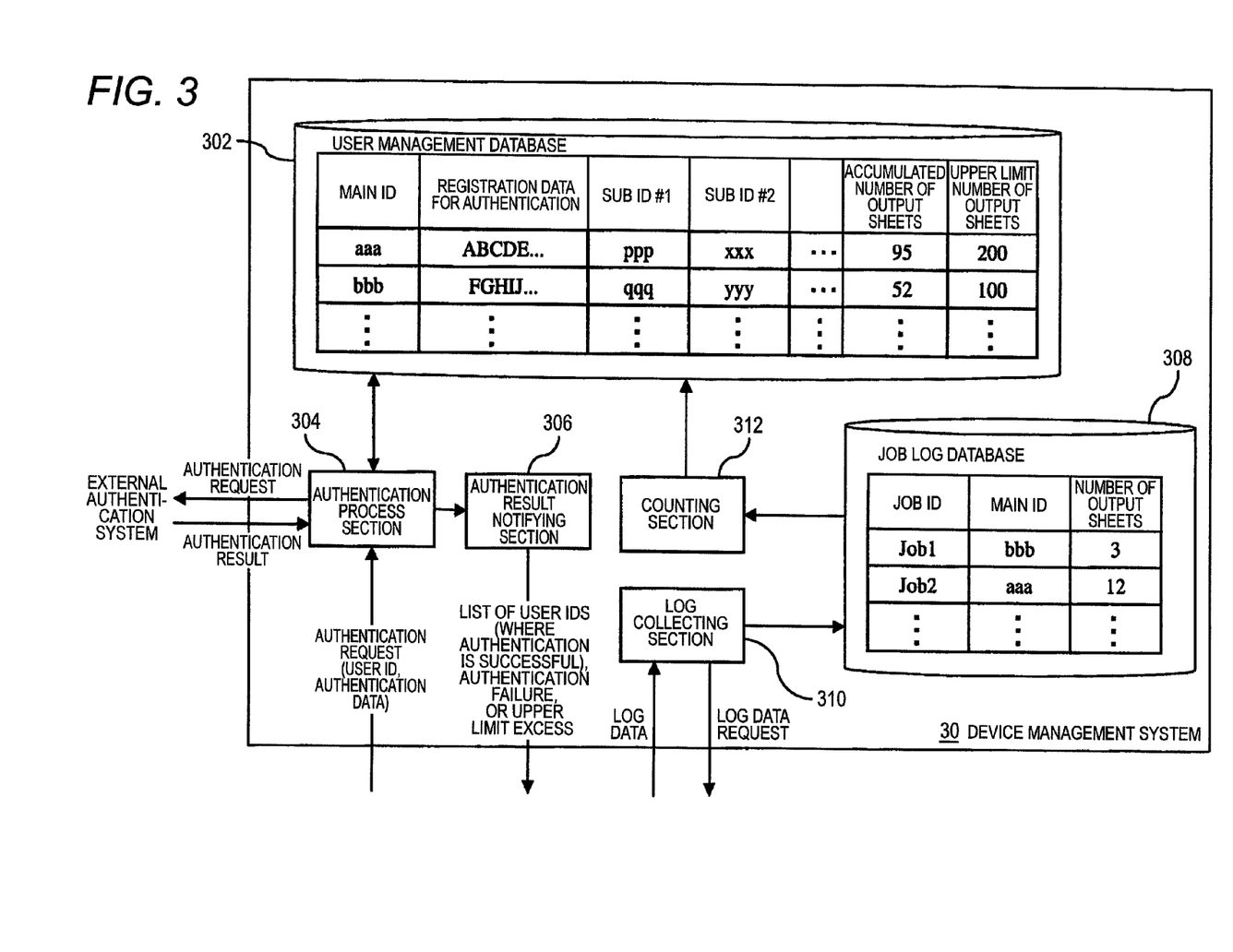
FIG. 3 shows an example of an internal configuration of a device management system according to the exemplary embodiment of the invention.

An authentication request section 210 transmits the user ID and authentication data relating to the authentication request, which are received by the authentication request receiving section 208, to an authentication process section 304 of the device management system 30, thereby requesting the user authentication. Also, the authentication request section 210 receives a result of the authentication request from an authentication result notifying section 306 of the device management system 30. The result of the authentication request includes an authentication validation (success) (which means the case where a combination of the user ID and authentication data related to the request is registered), an authentication failure (which means the case where a combination of the user ID and authentication data related to the request is not registered) and an upper limit excess (which means the case where the authentication is valid but the number of printed sheets allotted to a user (hereinafter, also referred to as the "number of printing output sheets" or the "number of output sheets") is exceeded). For the authentication failure or upper limit excess, a code that indicates the authentication failure or upper limit excess is transmitted from the authentication result notifying section 306. For the authentication validation, a list of the user IDs possessed by the user (hereinafter, referred to as a "user ID set") is transmitted from the authentication result notifying section 306. The user ID set is a set of the user IDs that are given to one actual user. The actual user is a natural person or human organization that actually uses the system. A user that is contrasted with the actual user and is conceptualized in the user authentication on account unit basis is an authentication unit that is registered in each user authentication system, and is a procedural user in this sense. The user ID set includes not only the user ID input by the actual user when requesting the authentication (this is a user ID that is registered in any one of the user authentication systems on the network 12) but also a user ID(s) of the same user that are registered in the other user authentication system(s).

An output candidate specifying section 212 specifies, as output candidates, jobs that are stored in the spool data storing section 206 in association with the user IDs included in the user ID set received by the authentication request section 210. An output instruction receiving section 214 presents the output candidate jobs to the user and receives an instruction indicating a job that will be actually output, from the user. Also, when plural jobs are instructed as the actual output targets (the jobs to be actually output) among the output candidate jobs, the output instruction receiving section 214 may receive an instruction indicating an output sequence of the actual output targets. The job managing section 204 receives job IDs of the respective output targets, which the user instructs through the output instruction receiving section 214, reads out the print data of the one or more output target jobs from the spool data storing section 206 and instructs a print process of the print data. If an output sequence is designated, the job managing section 204 instructs the print process of the respective jobs in accordance with the sequence. Based on this instruction, an image processing section and a print engine (not shown) are operated, so that an image indicated by the print data is printed and output.

A log managing section 216 generates log data, which indicates history of various processes (for example, reception and execution of the jobs) relating to the jobs in the printing device 20 and various errors, and stores the log data in a job log storing section 218 of the non-volatile storage device 22. In FIG. 2, a log (history) of a job execution result is exemplified. The log data of the job execution result includes information about a job ID of the job, a user ID of a user who requests the job, the number of sheets printed out by the job execution ('the number of output sheets'), and generation date and time (not shown) of an event of the log target. In the example of FIG. 2, a 'main ID' is registered as a user ID of a user who requests a job. The meaning and role of the main ID will be specifically described in detail later.

Also, the log managing section 216 submits the log data stored in the job log storing section 218, in response to a request from a log collecting section 310 of the device management system 30.

Next, an example of an internal configuration of the device management system 30 will be described with reference to FIG. 3.

In a user management database 302 provided in the device management system 30, (1) registration information for a user authentication service of the device management system 30, (2) set information of user IDs of a same user registered in the respective user authentication systems (the external authentication systems 14a, 14b and the device management system 30) on the network 12 and (3) information for managing the number of output sheets are registered.

(1) The registration information for the user authentication service of the device management system 30 is a set of a user ID ('main ID' in FIG. 3) of each user, which is registered for the user authentication service, and registration data for authentication.

(2) The set information of the user IDs, which a same user (one actual user) possesses, is a combination (i.e., user ID set) of data items indicated by a 'main ID', a 'sub ID#1' and a 'sub ID#2' in FIG. 3. In this example, a user ID which is registered for the user authentication service of the device management system 30 is referred to as the 'main ID', a user ID which is registered in the external authentication system 14a is referred to as the 'sub ID#1' and a user ID which is registered in the external authentication system 14b is referred to as the 'sub ID#2'. For a certain user, it can be seen from the example shown in FIG. 3 that a user ID 'aaa' is registered in the device management system 30, that a user ID 'ppp' is registered in the external authentication system 14a and that a user ID 'xxx' is registered in the external authentication system 14b. As can be seen from the above descriptions, one user ID set exists for one actual user, and the user ID set serves to associate the user IDs, which the actual user possesses, with each other.

The main ID is a representative user ID of the user IDs that the same user possesses. The main ID is used to manage and count the log and the number of output sheets in units of actual users (persons), rather than a user ID unit. Contrary to this, the sub IDs indicate user IDs other than the main ID.

It may be possible to define one of the user IDs as a main ID for each user or to define main IDs for the whole system of this exemplary embodiment. For the latter, it may be possible to configure in such a way that one of the user authentication systems (the external authentication systems 14a, 14b and the device management system 30) is designated as a main authentication system and a user ID registered in the main authentication system is recognized as a main ID. In the example of FIG. 3, a user ID that is used for user authentication of the device management system 30 is set as a main ID.

In the above, one of the user IDs that are registered in one user authentication system on the network 12 is set as a main ID. However, this is one of examples. In other words, apart from the user IDs, which are registered in the respective user authentication systems on the network 12, a user ID that is not used for user authentication may be registered as a main ID in the user management database 302.

Also, it may be possible that identification information such as a unique set name is given to each user ID set and various counting is performed in units of the identification information of the user ID set. In this case, the identification information of the user ID set serves as a main ID that represents an actual user, and the user ID that is used for authentication by the authentication service of the device management system 30 is characterized as a user ID in an individual authentication system, like the sub IDs #1, #2. In this case, accordingly, in the user management database 302, the identification information of the user ID set is registered as the main ID and the user ID that is used for authentication by the authentication service of the device management system 30 is registered as a type of the sub ID.

(3) The information for managing the number of output sheets includes the 'upper limit number of output sheets' and the 'accumulated number of output sheets.' The upper limit number of sheets is an upper limit value of printed sheets, which is allowed to the user for a predetermined time period (for example, one month). The accumulated number of output sheets is an accumulated value of sheets that the user prints out from the printing device 20 on the network 12 in a current time period.

In the example of FIG. 3, the information of (1) to (3) are organized in the one user management database 302. However, this is one of examples. In other words, the information of (1) to (3) may divided and organized in two or more databases. In this case, records of the respective databases may be matched by using the main ID as a key, for example.

The authentication process section 304 receives the authentication request from the printing device 20 and performs a process for user authentication related to the request. In this case, the authentication process section 304 determines as to whether the requested user authentication is performed in the authentication service of the authentication process section 304 or in the external authentication system 14a or 14b. Then, the authentication process section 304 makes a request for authentication to the determined authentication service or the determined authentication system. For example, if a user ID included in the authentication request is a main ID registered in the user management database 302, the authentication process section 304 itself performs the user authentication. In other words, the authentication process section 304 determines as to whether or not the authentication data included in the authentication request is identical with the registration data for authentication, which is registered in the database 302 in association with the user ID. If the authentication data is identical with the registration data for authentication, the authentication process section 304 determines that the authentication is valid, otherwise an authentication is failure. Also, if the user ID included in the authentication request corresponds to one of the sub IDs registered in the user management database 302, the authentication process section 304 transmits the user ID and the authentication data to the external authentication system 14a or 14b in which the sub ID is registered, thereby making a request for user authentication. For the request, for each type of sub IDs of the sub ID#1, the subID#2, . . . , address information of the external authentication systems corresponding to the types are registered in the device management system 30. The authentication process section 304 receives an authentication result (success or failure) from the external authentication system 14a or 14b of the request destination.

If the user authentication relating to the authentication request from the printing device 20 is successful, the authentication process section 304 reads out the other user IDs of the user having the user ID included in the authentication request from the user management database 302 and generates a user ID set including the read-out user IDs. The user ID set may or may not include the user ID included in the authentication request. Even if the user ID is not included, the printing device 20 having made the authentication request already knows the user ID included in the authentication request.

Also, if the user authentication is valid, the authentication process section 304 may further determine as to whether or not the 'accumulated number of output sheets' reaches the 'upper limit number of output sheets.' When the user logs in the printing device 20 so as to print the spooled print data, if the authentication process section 304 determines that the 'accumulated number of output sheets' reaches the 'upper limit number of output sheets', printing at this time would cases the printing output to exceed the upper limit number of output sheets. Therefore, in order not to exceed the upper limit number of output sheets, if the 'accumulated number of output sheets' reaches the 'upper limit number of output sheets', the authentication process section 304 does not determine that the authentication result is successful even though the user authentication is successful, but determines 'upper limit excess'.

The authentication result notifying section 306 transmits the authentication result obtained by the authentication process section 304 to the printing device 20 of the request destination. In this exemplary embodiment, the authentication result is one of the authentication failure, the upper limit excess and the authentication success. In the case of the authentication success, the user ID set is attached.

A job log database 308 is a database in which the log data, which is collected from the job log storing section 218 of each printing device 20 on the network 12, is intensively registered. Items included in the log data, which are registered in the job log database 308, may be the same as those included in the log data, which are recorded in the job log storing section 218.

The log collecting section 310 periodically collects a group of log data from the printing device 20, for example. If the log collecting section 310 requests the log data to the printing device 20, the printing device 20 transmits a group of log data that is registered after a previous collection timing, to the log collecting section 310. The log collecting section 310 registers the collected group of log data in the job log database 308. Although not shown in FIG. 3, if plural printing devices 20 exists on the network 12, each log data may be recorded in the job log database 308 together with the identification information of the printing devices 20 having generated the log data.

A counting section 312 counts, for each user, the number of output sheets included in the log data for a counting period, which is registered in the job log database 308, thereby calculating the accumulated number of printed sheets for each user for the counting period. A result of the calculation is registered in the user management database 302.

Figure 4:
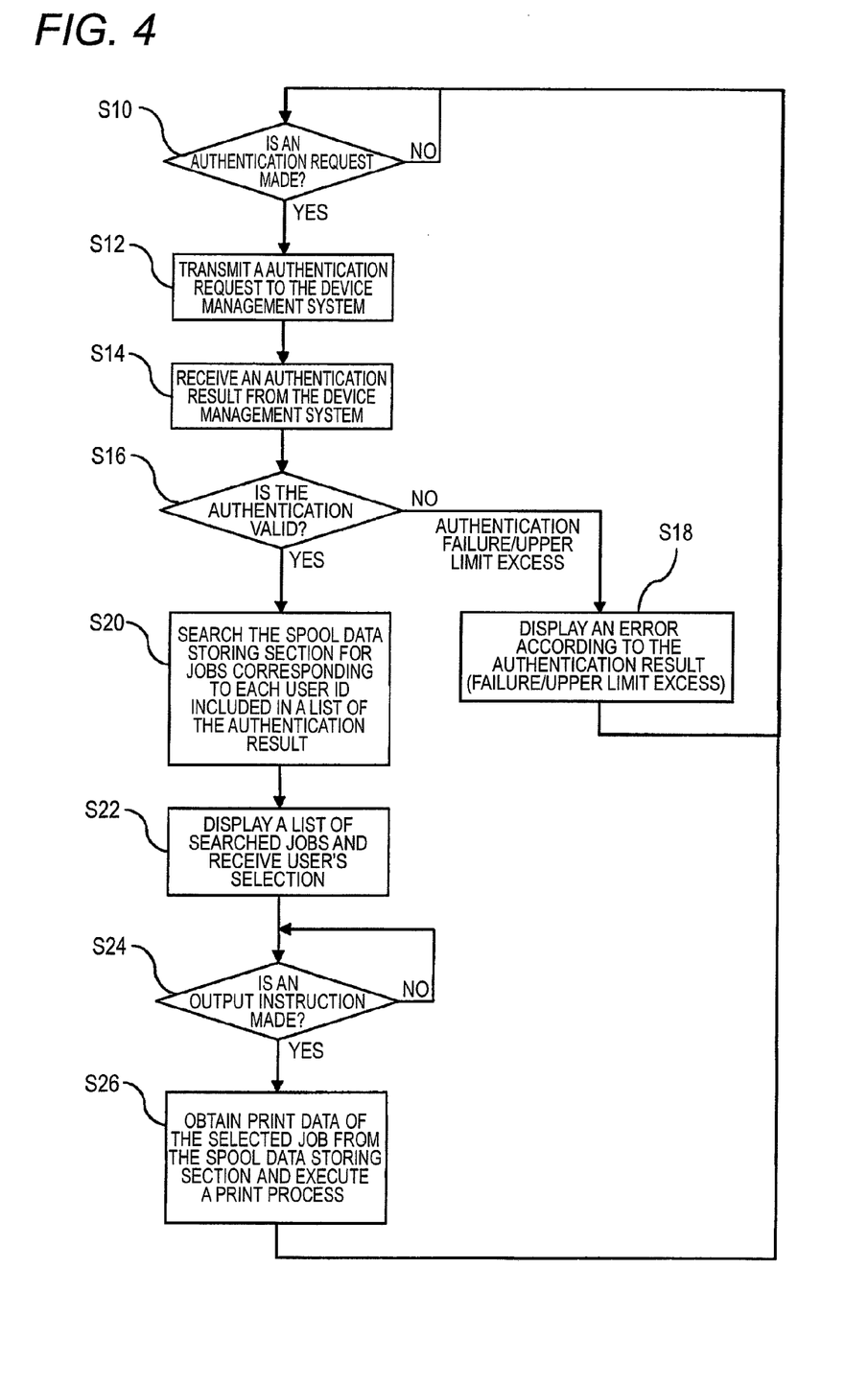
FIG. 4 shows an example of a process sequence of the printing device according to the exemplary embodiment of the invention.
Figure 5:
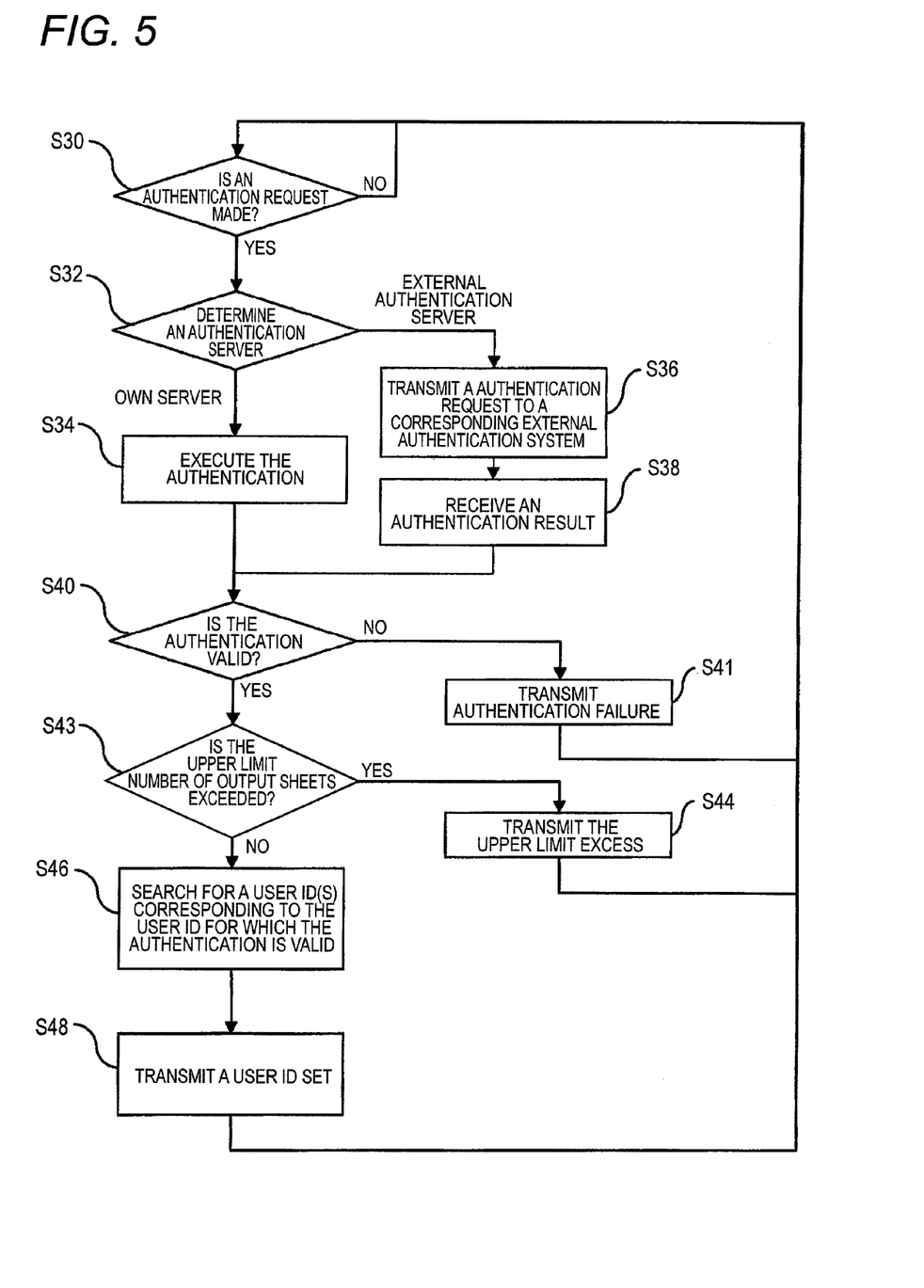
FIG. 5 shows an example of a process sequence of the device management system according to the exemplary embodiment of the invention.

Next, an example of a process operation of the system according to this exemplary embodiment will be described with reference to FIGS. 4 and 5. FIG. 4 shows an example of a process sequence of the printing device 20. FIG. 5 shows an example of a process sequence of the device management system 30.

As shown in FIG. 4, the authentication request receiving section 208 of the printing device 20 waits for an authentication request from a user (S10). If an authentication request is made, the authentication request section 210 transmits a user ID and authentication data, which are input when the authentication request is made, to the device management system 30, thereby making a request for user authentication (S12).

As shown in FIG. 5, the authentication process section 304 of the device management system 30 waits for the authentication request from the printing device 20 (S30). If the authentication process section 304 receives the authentication request from the printing device 20, the authentication process section 304 determines as to whether an authentication server, which should process the authentication request, is the authentication process section 304 itself or one of the external authentication systems 14a, 14b, based on a type of the user ID included in the authentication request (S32). If the user ID included in the authentication request is a main ID in the user management database 302, the authentication process section 304 itself performs the user authentication (S34). Otherwise, the authentication process section 304 requests the user authentication to the external authentication system 14a or 14b corresponding to the user ID (S36) and receives a result of the authentication (S38).

The authentication process section 304 determines as to whether or not the result of the authentication in S34 or S38 is successful (S40). If the result of the authentication is failure, the authentication result notifying section 306 transmits a code indicating the authentication failure to the printing device 20 (S41). If the result of the authentication is successful, the authentication process section 304 reads out the accumulated number of output sheets and the upper limit number of output sheets associated with the user for whom the authentication is valid from the user management database 302 and determines as to whether or not the accumulated number of output sheets reaches the upper limit number of output sheets (S43). If the accumulated number of output sheets reaches the upper limit number of output sheets, the authentication result notifying section 306 transmits a code indicating the upper limit excess to the printing device 20 (S44).

If it is not determined in S43 that the accumulated number of output sheets reaches the upper limit number of output sheets, the authentication process section 304 searches the user management database 302 for other user IDs of the user possessing the user ID for which the authentication is valid (S46). Then, the authentication result notifying section 306 transmits a user ID set including the searched user ID(s) (S48). The user ID set also includes the information indicating which user ID of the user ID set is a main ID.

Referring back to the description of FIG. 4, after the authentication request section 210 requests the authentication to the device management system 30 in S12, the authentication request section 210 receives the result of the authentication, which is a result of the request, from the device management system 30 (S14). The authentication request section 210 determines a type of the received authentication result (S16). If the authentication result indicates authentication failure or upper limit excess, the authentication request section 210 displays an error message indicating the authentication failure or an error message indicating the upper limit excess on a display device of the printing device 20 (S18).

If it is determined in S16 that the authentication result is successful, the output candidate specifying section 212 searches the spool data storing section 206 for jobs, which are registered in association with each user ID included in the user ID set of the authentication result (S20). In other words, for each user ID included in the user ID set, the output candidate specifying section 212 searches the spool data storing section 206 for jobs, which are registered in association with each user ID. In the case where such a method is adopted that the user ID of the authentication requester is not included in the user ID set, which is provided by the device management system 30, the output candidate specifying section 212 also searches for print data corresponding to the user ID of the authentication requester as well as print data corresponding to the user ID(s) of the user ID set. The output candidate specifying section 212 displays a list of the searched jobs. Then, the output candidate specifying section 212 receives, from the user, an instruction about a selection of an output target to be printed out this time and an output sequence of the selected output target(s) (S22). Regarding the list display of the search results, one or more information indicating characteristics of the jobs such as thumbnail images of representative sheets (for example, first page) of the respective jobs and attribute information of the jobs (for example, file name of original application data, date and time of creation of the original application data, and date and time of spooling the print data) may be displayed for helping the user to make decision. The information, such as the file name of the original application data and the date and time of creation of the original application data, of the print data may be transmitted from the user PC 10 to the printing device 20, as the attribute information of the jobs, and may be registered in the spool data storing section 206.

The user selects one or more jobs to be printed out from the list display (if there are plural selected jobs, the user also instructs an output sequence of the selected jobs) and instructs an output operation (for example, pushes a start button). If the output instruction is received (S24), the job managing section 204 executes the print process of each of the selected jobs (if the output sequence is designated, the job managing section 204 executes the print process in accordance with the designated sequence).

The log managing section 216 generates log data of the respective jobs printed out as described above and registers the generated log data of the respective jobs in the job log storing section 218. At this time, the log managing section 216 writes the main ID of the user ID set, which is acquired from the device management system 30, in the field of the main ID of the log data.

As described above, in this exemplary embodiment, the device management system 30 stores the group of the user IDs, which the user possesses, in association with each other. If the user authentication is successful, the device management system 30 provides the list of the group of the user IDs (user ID set), which the user possesses, to the printing device 20. Accordingly, even if the user performs the user authentication with any user ID in requesting the printing, print data that the user requests to the printing device 20 with another user ID is also searched for as the output target candidate and is presented to the user.

In the device management system 30, the counting section 312 counts the number of output sheets of the log data, which is registered in association with the main ID of each user, so that the counting section 312 calculates the accumulated value of the number of printed sheets for each actual user, rather than for each user ID. Thereby, even if the user uses plural user IDs, it is possible to suppress the number of printed sheets within a range of the upper limit in the user unit. In the above exemplary embodiment, the management is made based on the number of printed sheets. However, the management may be made based on a printing amount, other than the number of printed sheets, for example the number of printed surfaces (in modified exemplary embodiments described later, this is also applicable).

In the above exemplary embodiment, the output candidate specifying section 212 presents the specified output target candidate jobs to the user and requests the user to select. However, the specified output target candidate jobs may be automatically printed out without the user's selection. This is also applicable to the modified exemplary embodiments which will be described later.

In the above exemplary embodiment, the job log storing section 218 of the printing device 20 stores the main ID as the user ID of the requester who requests a job. However, the requester ID (i.e., the user ID, which is included in the print request from the user PC 10 together with the print data) may be stored instead of the main ID. In this case, the log collecting section 310 of the device management system 30 replaces the requester ID of the log data collected from the printing device 20 with the main ID by referring to the user management database 302 and then registers the log data after the replacement in the job log database 308.

Figure 6:
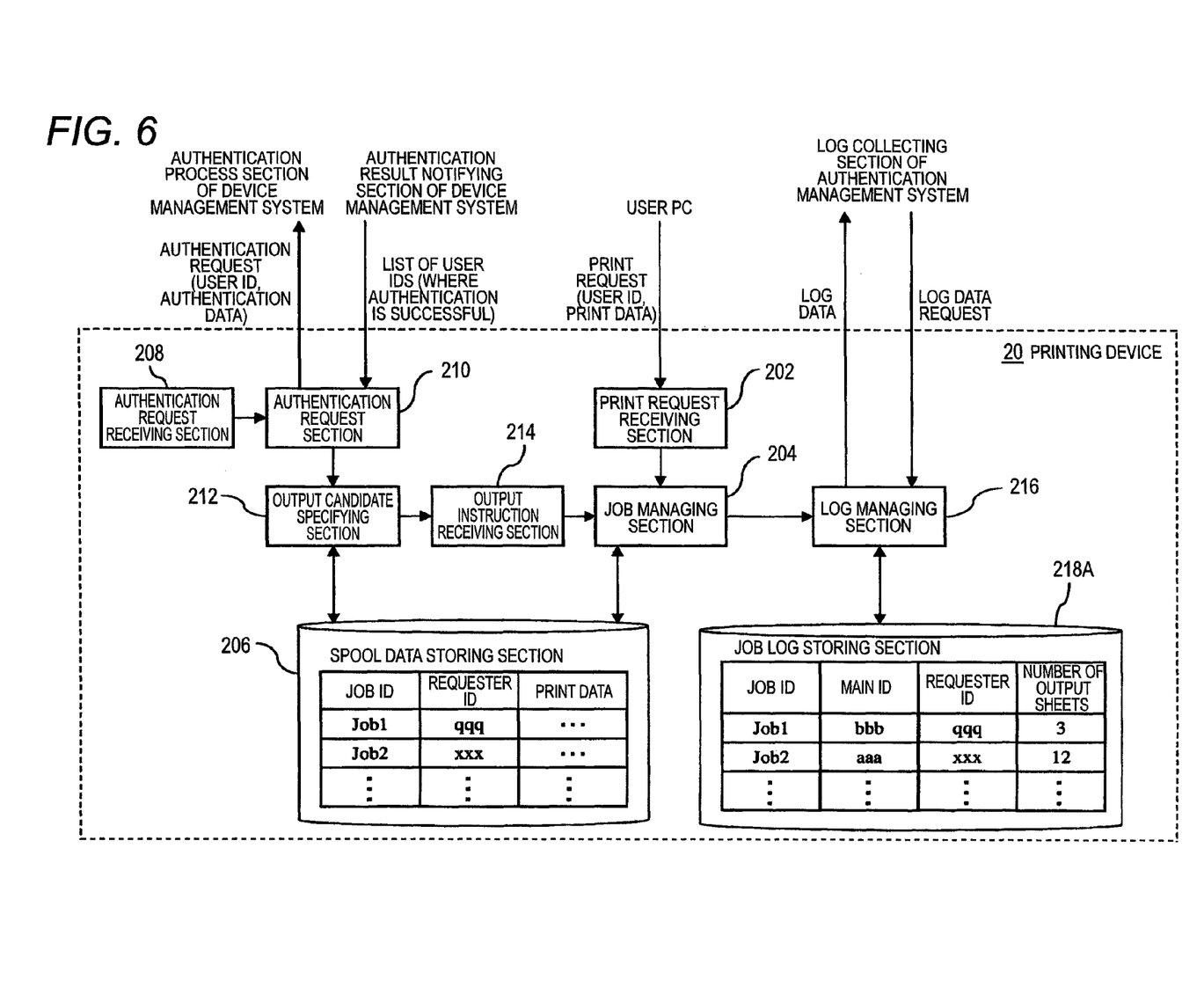
FIG. 6 shows an example of an internal configuration of the printing device according to a modified exemplary embodiment.
Figure 7:
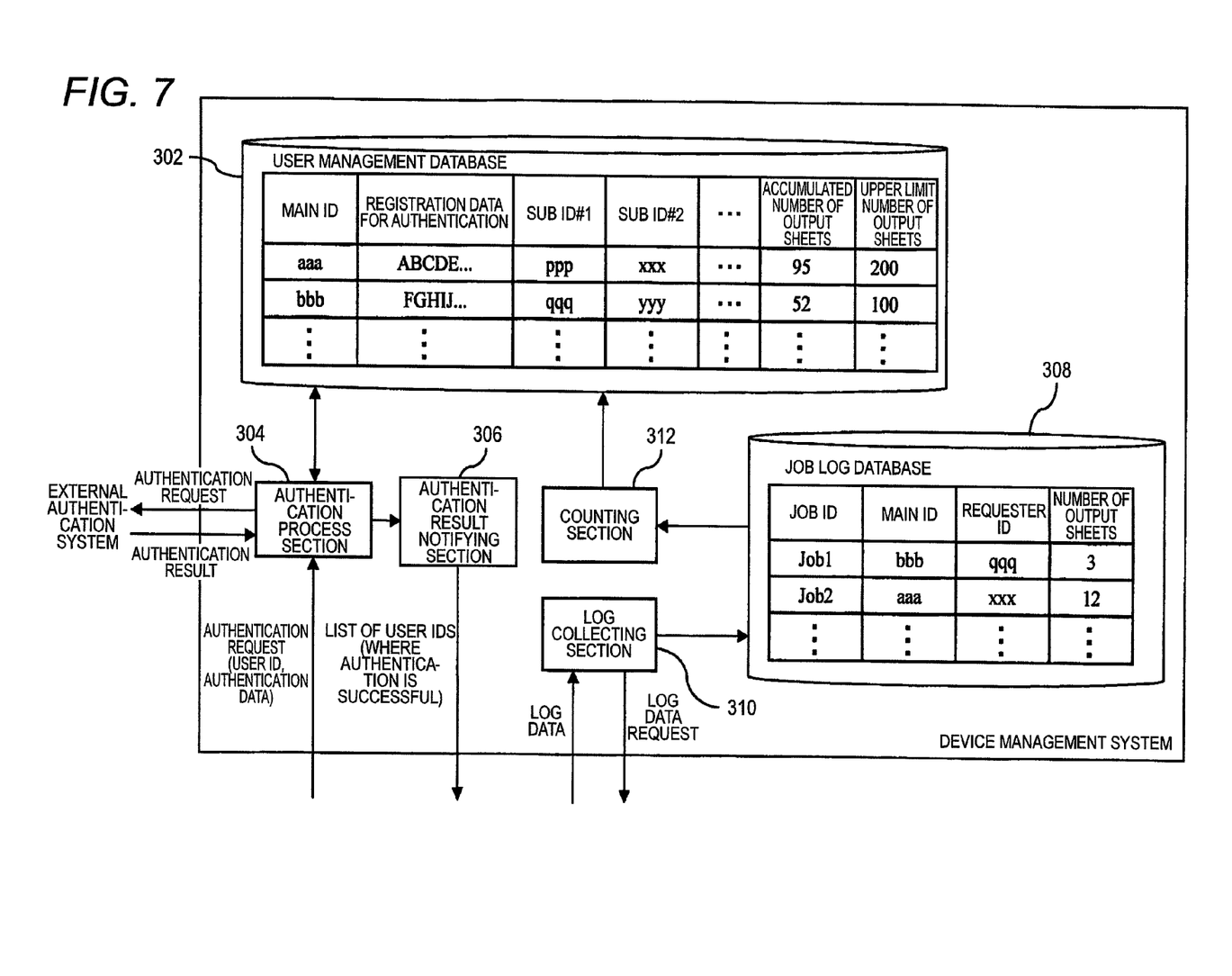
FIG. 7 shows an example of an internal configuration of the device management system according to a modified exemplary embodiment.

Next, a modified exemplary embodiment of the above exemplary embodiment will be described with reference to FIGS. 6 and 7. In FIGS. 6 and 7, the same constitutional elements as those shown in FIGS. 2 and 3 are indicated with the same reference numerals, and description thereof will be omitted.

As shown in FIG. 6, according to this modified exemplary embodiment, the log managing section 216 stores the log data in a job log managing section 218A. The stored log data includes not only the main ID of a requester of a job printed out but also the requester ID included in the print requests.

Correspondingly to this, as shown in FIG. 7, the log data which is registered in the job log database 308 of the device management system 30 also includes both the main ID of the user who requests each job and the requester ID.

In this modified exemplary embodiment, both the main ID and the requester ID are included in the log data. Therefore, by counting the log data having the same main ID, it is possible to obtain a counting result in an actual user (person) unit. Also, by counting the log data having the same requester ID, it is possible to obtain a counting result for each of the user IDs that the user uses for the request.

Figure 8:
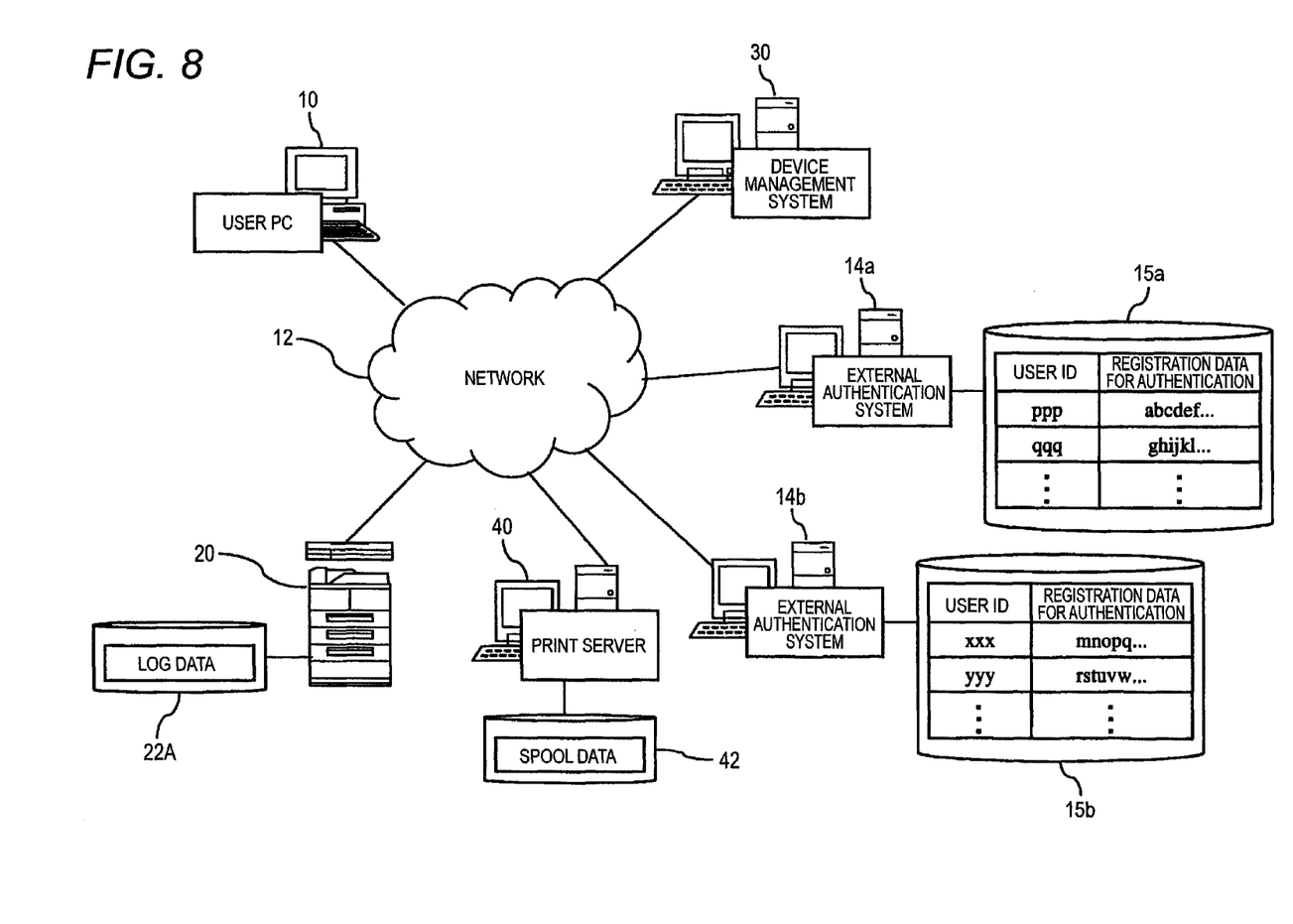
FIG. 8 shows an example of a system configuration according to a second modified exemplary embodiment.

Next, a second modified exemplary embodiment will be described with reference to FIGS. 8 to 10.

In the second modified exemplary embodiment, a printer server 40 is provided on the network 12. The user PC 10 requests printing to the printer server 40, not the printing device 20. The information such as print data relating to the print request is stored, as spool data, in a storage device 42 of the printer server 40. A non-volatile storage device 22A of the printing device 20 stores the log data but does not store the spool data. The other configurations may be the same as those of the exemplary embodiment shown in FIG. 1.

Figure 9:
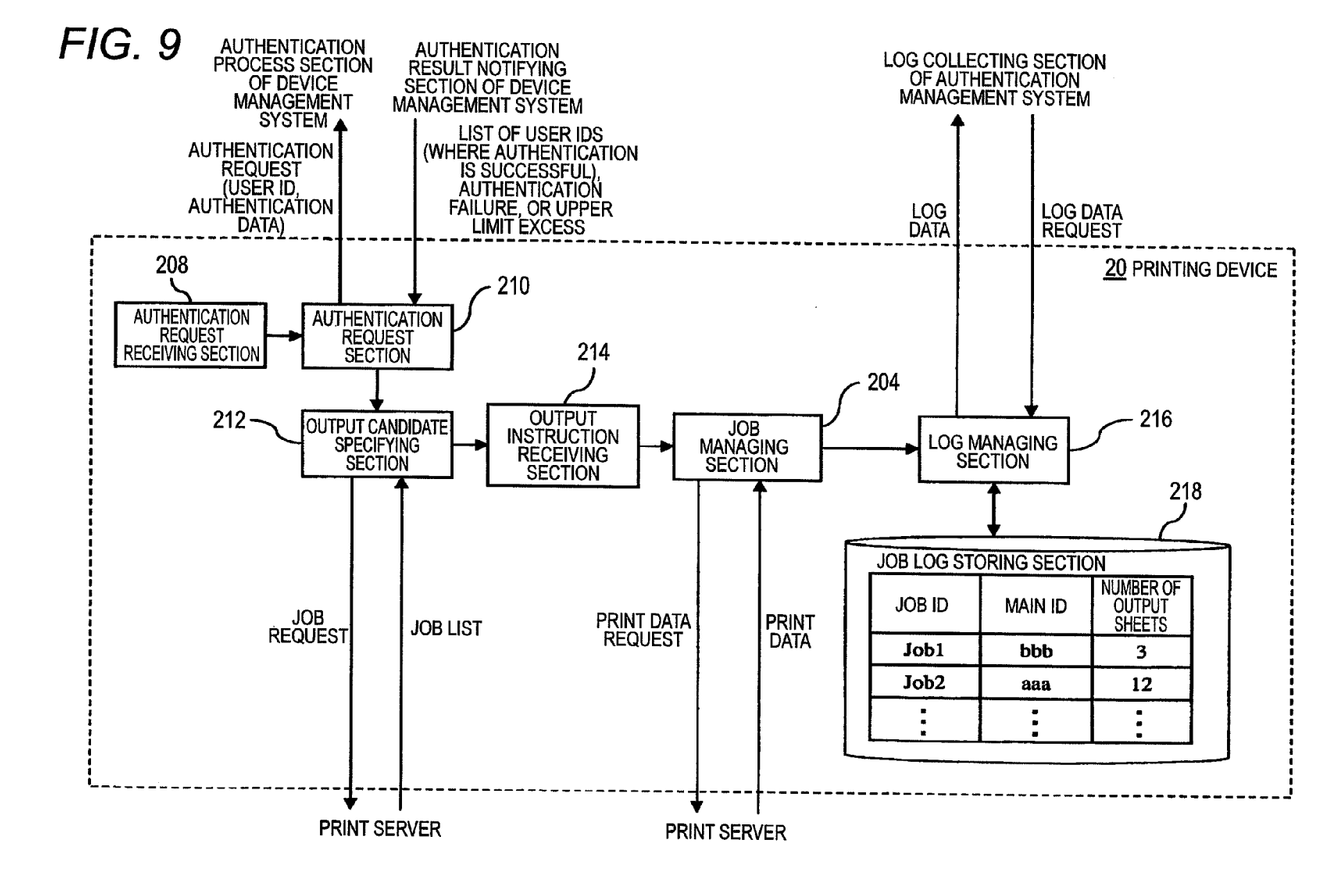
FIG. 9 shows an example of an internal configuration of a printing device according to the second modified exemplary embodiment.

In FIG. 9, an example of the internal configuration of the printing device 20 of the second modified exemplary embodiment is shown. In FIG. 9, the same constitutional elements as those shown in FIG. 2 are indicated with the same reference numerals, and the descriptions thereof will be omitted. The printing device 20 of the second modified exemplary embodiment does not have the spool data storing section 206. Accordingly, if the output candidate specifying section 212 receives the user ID set, which is provided from the device management system 30, through the authentication request section 210, the output candidate specifying section 212 requests the jobs, which are spooled in association with the respective user IDs included in the user ID set, to the printer server 40. A list of the jobs, which is transmitted from the printer server 40 in response to the request, is displayed on a screen by the output instruction receiving section 214 so as to receive an instruction regarding a selection and an output sequence from the user. Also, the job managing section 204 transmits to the print server 40 the job IDs of the respective jobs that the user designates as output targets through the output instruction receiving section 214 and requests the print data corresponding to the job IDs. Then, the job managing section 204 prints out the print data, which is provided from the print server 40 in response to the request.

Figure 10:
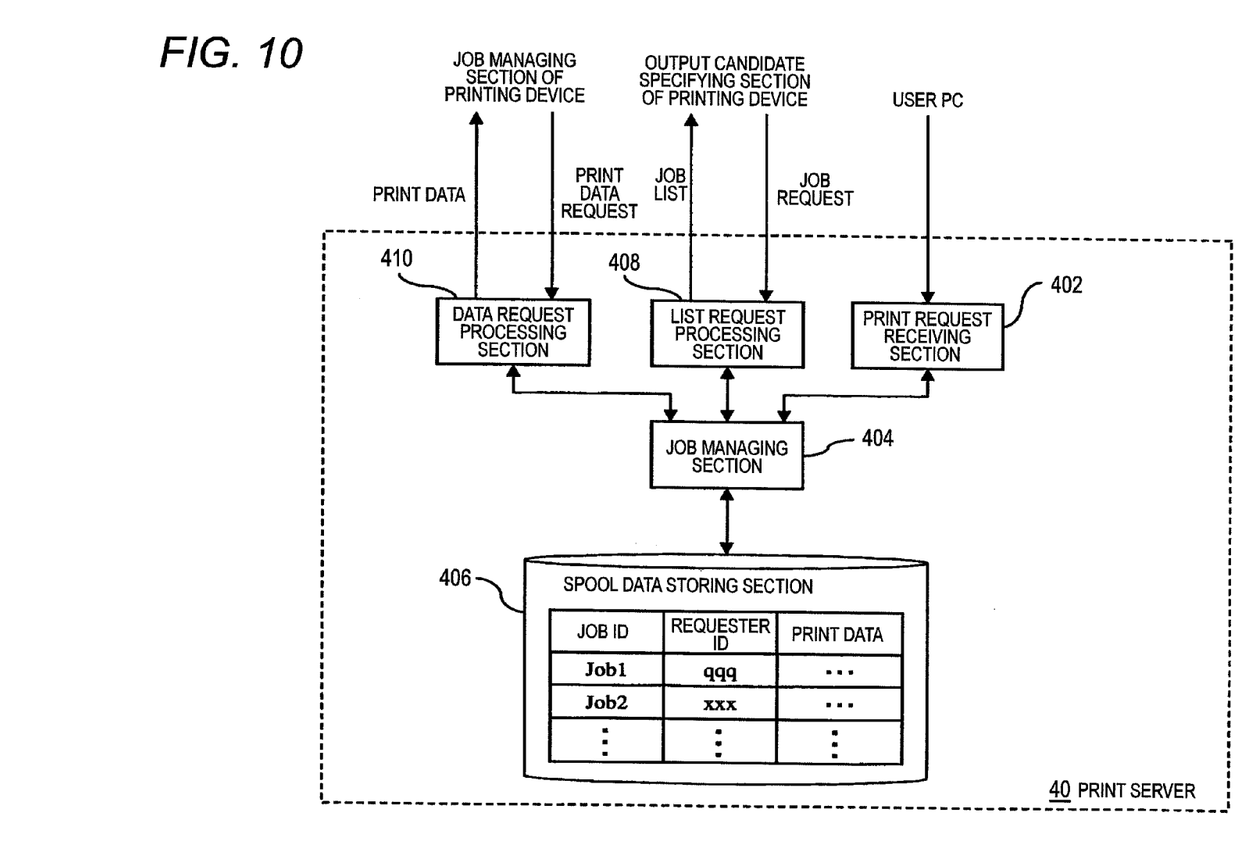
FIG. 10 shows an example of an internal configuration of a print server according to the second modified exemplary embodiment.

FIG. 10 shows an example of an internal configuration of the print server 40 of the second modified exemplary embodiment.

In the print server 40, a print request receiving section 402 receives the print request from the user PC 10. The job information such as the user ID and the print data, which are included in the received print request, is stored in a spool data storing section 406 by a job managing section 404.

A list request processing section 408 receives the user ID set from the output candidate specifying section 212 of the printing device 20 and requests the job managing section 404 to search for jobs, which are spooled in association with the respective user IDs of the user ID set. In response to the request, the job managing section 404 transmits a list of the jobs searched from the spool data storing section 406 to the output candidate specifying section 212 of the printing device 20.

Also, a data request processing section 410 receives a request for print data including the job ID from the job managing section 204 of the printing device 20 and searches the spool data storing section 406 for the print data, which is spooled in association with the job ID, via the job managing section 404. Then, the data request processing section 410 transmits the searched print data to the printing device 20.

In the exemplary embodiment and the modified exemplary embodiments, the device management system 30 is an apparatus that is physically different from the printing device 20. However, a part or all of the functions of the device management system 30 may be incorporated in the printing device 20.

The information processing mechanisms (functional modules shown in FIG. 2) of the printing device 20, the device management system 30 and the print server 40 are realized by implementing programs indicating the processes of the respective functional modules in a universal computer. The computer has a circuit configuration in which a microprocessor such as CPU, a memory (primary memory) such as RAM and ROM (Read Only Memory), a HDD controller that controls a HDD (hard disk drive), a variety of I/O (input/output) interfaces, a network interface that controls connection with a network such as local area network, and the like are connected via a bus. Also, a disk driver for reading and/or writing from and/or to a transportable disk recording medium such as CD and DVD, a memory reader/writer for reading and/or writing from and/or to a transportable non-volatile recording medium such as flash memory, and the like may be connected to the bus via the I/O interface, for example. The program in which the process contents of the respective functional modules are described is stored in a fixed storage device such as hard disk drive via a recording medium such as CD and DVD or via a communication means such as network, and is thus installed in the computer. The program, which is stored in the fixed storage device, is read into the RAM and is then executed by the microprocessor such as CPU, so that the functional modules as described above are implemented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing authentication system comprising:
a printing device; and
a device management apparatus, wherein
the device management apparatus includes
an identification information storage unit configured to store, as an identification information set, plural pieces of user identification information given to a same user, and
a providing unit configured to read, in response to validation of an authentication request accompanying specific user identification information from the printing device, the identification information set including the specific user identification information from among the plural pieces of the user identification information stored at the identification information storage unit and provide the identification information set to the printing device, and
the printing device includes
a specifying unit configured to specify, in response to identification information associated with print data of a requester who requests printing of the print data matching any one of the plural pieces of the user identification information constituting the identification information set received from the device management apparatus, the print data as a printing target, and
a printing execution unit configured to execute the printing of the print data specified as the printing target by the specifying unit.

2. The printing authentication system according to claim 1, wherein
the providing unit of the device management apparatus is further configured to provide the printing device with information indicating representative user identification information of the plural pieces of the user identification information included in the identification information set,
the printing device further includes a history storage unit configured to store history information based on a result of the execution by the printing execution unit, and
the history storage unit stores, as the history information, a record including
information indicating a printing amount as the result of the execution, associated with the representative user identification information.

3. The printing authentication system according to claim 2, wherein
the device management apparatus further includes
a selecting unit configured to select, in response to receiving the authentication request accompanying the specific user identification information, an authentication unit based on the specific user identification information, and a transmission unit configured to transmit the authentication request to the selected authentication unit, and the providing unit is configured to provide, in response to the selected authentication unit validating the authentication request, the identification information set including the specific user identification information to the printing device.

4. The printing authentication system according to claim 1, wherein the device management apparatus further includes a selecting unit configured to select, in response to receiving the authentication request accompanying the specific user identification information, an authentication unit based on the specific user identification information, and a transmission unit configured to transmit the authentication request to the selected authentication unit, and the providing unit is configured to provide, in response to the selected authentication unit validating the authentication request, the identification information set including the specific user identification information to the printing device.

5. The printing authentication system of claim 1, wherein each of the plural pieces of the user identification information uniquely identifies the same user.

6. A printing device comprising:

a first receiving unit configured to receive specific user identification information from a user;

a transmission unit configured to transmit an authentication request including the specific user identification information to a device management apparatus;

a second receiving unit configured to receive, in response to validation of the authentication request, an identification information set unique to the user that is provided by the device management apparatus, the identification information set including plural pieces of user identification information given to the user, the plural pieces including the specific user identification information;

a specifying unit configured to specify, in response to user identification information associated with print data of a requester who requests printing of the print data matching any one of the plural pieces of the user identification information constituting the identification information set received from the device management apparatus, the print data as a printing target; and a printing execution unit configured to execute the printing of the print data, which is specified as the printing target by the specifying unit.

7. The printing device according to claim 6, further comprising:

a history storage unit that stores history information based on a result of the execution by the printing execution unit, wherein the history storage unit stores, as the history information, a record including information indicating a printing amount as the result of the execution associated with information indicating the identification information set provided from the device management apparatus.

8. The printing device of claim 6, wherein each of the plural pieces of the user identification information uniquely identifies the user.

9. A printing authentication method comprising:

storing, as an identification information set, plural pieces of user identification information given to a same user in an identification information storage unit;

reading, in response to validation of an authentication request accompanying specific user identification information from a printing device, the identification information set including the specific user identification information from among the stored plural pieces of the user identification information stored and providing the identification information set to the printing device; and specifying at the printing device, in response to identification information associated with print data of a requester who requests printing of the print data matching any one of the plural pieces of the user identification information constituting the identification information set, the print data as a printing target.

10. The printing authentication method of claim 9, wherein each of the plural pieces of the user identification information uniquely identifies the same user.

\* \* \* \* \*